US012252141B2

(12) United States Patent
Kobayashi et al.

(10) Patent No.: US 12,252,141 B2
(45) Date of Patent: Mar. 18, 2025

(54) VEHICLE AND METHOD FOR DIAGNOSING DETERIORATION OF ON-VEHICLE COMPONENT

(71) Applicant: TOYOTA JIDOSHA KABUSHIKI KAISHA, Toyota (JP)

(72) Inventors: Ryosuke Kobayashi, Nagakute (JP); Tomokazu Maya, Nagoya (JP); Tsuyoshi Okada, Nagoya (JP); Hiromitsu Fujii, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 17/994,564

(22) Filed: Nov. 28, 2022

(65) Prior Publication Data

US 2023/0234598 A1 Jul. 27, 2023

(30) Foreign Application Priority Data

Jan. 24, 2022 (JP) .................... 2022-008616

(51) Int. Cl.
*B60W 50/02* (2012.01)
*B60W 50/04* (2006.01)
*B60W 60/00* (2020.01)
*G07C 5/08* (2006.01)

(52) U.S. Cl.
CPC ...... *B60W 50/0205* (2013.01); *B60W 50/045* (2013.01); *B60W 60/00* (2020.02); *G07C 5/0808* (2013.01)

(58) Field of Classification Search
CPC ........... B60W 50/0205; B60W 50/045; B60W 60/00; B60W 50/00; B60W 50/04; B60W 60/001; B60W 2050/0002; B60W 2050/0019; B60W 2050/041; G07C 5/0808; G05B 23/0283; G01M 17/007
USPC .......................................... 701/23
See application file for complete search history.

(56) References Cited

U.S. PATENT DOCUMENTS

| | | | |
|---|---|---|---|
| 10,328,802 B2 * | 6/2019 | Gaither | ............... B60T 17/22 |
| 2018/0037206 A1 * | 2/2018 | Antanaitis | ............ B60T 8/4872 |
| 2019/0107163 A1 * | 4/2019 | Medinei | ............... F16D 66/026 |
| 2019/0176794 A1 * | 6/2019 | Pinto, IV | ............... B60T 17/22 |
| 2020/0232531 A1 * | 7/2020 | Robere | ................ F16D 66/00 |
| 2021/0146913 A1 | 5/2021 | Kumar et al. | |
| 2021/0354709 A1 | 11/2021 | Harada | |
| 2022/0017119 A1 | 1/2022 | Tanaka et al. | |

(Continued)

FOREIGN PATENT DOCUMENTS

| | | |
|---|---|---|
| JP | 2006096060 A | 4/2006 |
| JP | 2020-090229 A | 6/2020 |
| JP | 2021-178575 A | 11/2021 |

*Primary Examiner* — Tyler D Paige
(74) *Attorney, Agent, or Firm* — Dinsmore & Shohl LLP

(57) ABSTRACT

A vehicle includes a storage device configured to store an estimation algorithm configured to output a degree of deterioration of a component mounted on the vehicle in response to an input of a value of a parameter related to the component, a sensor configured to detect the value of the parameter, and a control device. The control device is configured to execute a performance test by autonomous driving of the vehicle, acquire data indicating performance of the component during the performance test, and update the estimation algorithm by using the data acquired during the performance test.

9 Claims, 7 Drawing Sheets

(56) References Cited

U.S. PATENT DOCUMENTS

2022/0260127 A1\* 8/2022 Xing .................... F16D 66/023
2023/0234598 A1\* 7/2023 Kobayashi ........... G07C 5/0808

\* cited by examiner

VEHICLE AND METHOD FOR DIAGNOSING DETERIORATION OF ON-VEHICLE COMPONENT

CROSS-REFERENCE TO RELATED APPLICATION

This application claims priority to Japanese Patent Application No. 2022-008616 filed on Jan. 24, 2022, incorporated herein by reference in its entirety.

BACKGROUND

1. Technical Field

The present disclosure relates to a vehicle and a method for diagnosing deterioration of an on-vehicle component.

2. Description of Related Art

For example, Japanese Unexamined Patent Application Publication No. 2006-096060 (JP 2006-096060 A) discloses a system in which at least vehicle status information required for inspection and maintenance of a customer vehicle including an on-vehicle terminal is sent from the on-vehicle terminal to a management center.

SUMMARY

In recent years, there is a demand for longer lives of vehicles from the viewpoint of reducing an environmental load. To extend the life of a vehicle, it is desirable to diagnose deterioration of on-vehicle components in the vehicle in use, and replace the on-vehicle components at an appropriate timing. It is also desirable that functions can be retrofitted to commercially available base vehicles in response to needs that change with time. Examples of the retrofitted functions (systems) include an autonomous brake system and an autonomous driving kit (autonomous driving system).

The method for diagnosing deterioration of an on-vehicle component may be a method using an estimation algorithm indicating a relationship between a predetermined parameter related to the on-vehicle component (hereinafter also referred to as "deterioration parameter") and the degree of deterioration of the on-vehicle component. The estimation algorithm outputs the degree of deterioration of the on-vehicle component in response to an input of the value of the deterioration parameter related to the on-vehicle component. A computer mounted on the vehicle can acquire the degree of deterioration of the on-vehicle component by inputting the value of the deterioration parameter detected in the vehicle in use into the estimation algorithm.

However, how the on-vehicle component deteriorates varies from vehicle to vehicle due to individual differences in vehicles. Therefore, the estimation algorithm may be optimized for each vehicle in an automobile manufacturing factory before shipping of the vehicle and a storage device storing the optimized estimation algorithm may be mounted on the vehicle. If any function is retrofitted to the shipped vehicle (base vehicle), however, the characteristics of the vehicle may change and the estimation accuracy of the estimation algorithm may decrease. It is inefficient to individually optimize the estimation algorithms for the vehicles in the automobile manufacturing factory, leading to an increase in vehicle costs.

The present disclosure provides a technology that can update the estimation algorithm installed in the vehicle appropriately.

A vehicle according to a first aspect of the present disclosure includes a storage device configured to store an estimation algorithm configured to output a degree of deterioration of a component mounted on the vehicle in response to an input of a value of a parameter related to the component, a sensor configured to detect the value of the parameter, and a control device. The control device is configured to execute a performance test by autonomous driving of the vehicle, acquire data indicating performance of the component during the performance test, and update the estimation algorithm by using the data acquired during the performance test.

With the above configuration, the control device executes the performance test by the autonomous driving of the vehicle, and updates the estimation algorithm based on a result of the performance test (data acquired during the performance test). In the vehicle having such a configuration, it is possible to appropriately update the estimation algorithm depending on the characteristics of the vehicle. With the updated estimation algorithm, it is possible to estimate the degree of deterioration of the on-vehicle component with high accuracy in the vehicle in use.

The estimation algorithm may be a rule-based program or an artificial intelligence (AI) algorithm. The estimation algorithm may include at least one of a mathematical expression, a map, and a model. The control device may be a single computer or may include a plurality of computers.

In the vehicle according to the first aspect of the present disclosure, the control device may be configured to execute the autonomous driving of the vehicle during a predetermined operation period. The control device may be configured to, when a first operation period and a second operation period are set in the control device, execute the performance test within a period from an end of the first operation period to a start of the second operation period. The second operation period may be an operation period subsequent to the first operation period.

In the above configuration, the vehicle is operated by the autonomous driving. The performance test is executed during an interval between the operations of the vehicle. This suppresses hindrance to the vehicle operation due to the performance test.

In the vehicle according to the first aspect of the present disclosure, the control device may be configured to input the value of the parameter detected by the sensor to the estimation algorithm during the operation period, and determine, by using the degree of deterioration of the component that is output from the estimation algorithm, whether the degree of deterioration of the component exceeds a predetermined threshold.

In the above configuration, determination is made as to whether the degree of deterioration of the component has exceeded the predetermined threshold based on the output from the estimation algorithm during the operation of the vehicle. With such a configuration, it is easier to replace the component at an appropriate timing. Since the updated estimation algorithm can estimate the degree of deterioration of the component with high accuracy, the threshold margin can be reduced. Therefore, it is easier to use the component until a time immediately before the end of its life. The extension of the life of the component contributes to reduction of environmental load.

In the vehicle according to the first aspect of the present disclosure, the data acquired by the performance test may include at least one of data indicating braking performance of the vehicle and data indicating acceleration performance of the vehicle. The control device may be configured to execute calibration for the autonomous driving of the vehicle by using the data acquired by the performance test.

In the above configuration, the calibration facilitates appropriate execution of the autonomous driving of the vehicle. In addition, it is possible to execute the calibration efficiently by acquiring the data for the calibration through the performance test.

In the vehicle according to the first aspect of the present disclosure, the control device may be configured to, when an update count of the estimation algorithm is equal to or larger than a predetermined count, estimate the degree of deterioration of the component by using the estimation algorithm during the autonomous driving of the vehicle.

The estimation accuracy of the estimation algorithm may be improved more as the update count of the estimation algorithm increases. With the above configuration, it is possible to suppress the use of the estimation algorithm with low estimation accuracy.

In the vehicle according to the first aspect of the present disclosure, the component mounted on the vehicle may be a brake pad constituting a hydraulic disc brake device. The parameter related to the component may be a hydraulic pressure level of the brake pad. The data acquired by the performance test may include data indicating braking performance of the vehicle.

With the above configuration, the control device can easily estimate the degree of deterioration of the brake pad with high accuracy by using the updated estimation algorithm. By estimating the degree of deterioration of the brake pad with high accuracy, it is possible to extend the life of the brake pad.

In the vehicle according to the first aspect of the present disclosure, the component mounted on the vehicle may be a traction motor. The parameter related to the component may be at least one of a current for driving the traction motor and a temperature of the traction motor. The data acquired by the performance test may include data indicating acceleration performance of the vehicle.

With the above configuration, the control device can easily estimate the degree of deterioration of the traction motor with high accuracy by using the updated estimation algorithm. By estimating the degree of deterioration of the motor with high accuracy, it is possible to extend the life of the motor.

The vehicle according to the first aspect of the present disclosure may further include an autonomous driving kit and a vehicle control interface configured to mediate exchange of a signal between the control device and the autonomous driving kit. The autonomous driving kit may be configured to send a command for the autonomous driving to the control device via the vehicle control interface. The control device may be configured to control the vehicle in response to the command from the autonomous driving kit, and send a signal indicating a status of the vehicle to the autonomous driving kit via the vehicle control interface.

Since the above vehicle includes the vehicle control interface, the autonomous driving kit is easily retrofitted. The autonomous driving kit may be retrofitted to a commercially available base vehicle. The control device may be operable alone even when the autonomous driving kit is detached. Even in the vehicle retrofitted with the autonomous driving kit, the estimation algorithm is appropriately updated depending on the characteristics of the vehicle by executing the performance test and the update process described above.

A vehicle according to a second aspect of the present disclosure includes a storage device configured to store a first estimation algorithm and a second estimation algorithm, a first sensor, a second sensor, and a control device. The first estimation algorithm is configured to output a degree of deterioration of a first component mounted on the vehicle in response to an input of a value of a first parameter related to the first component. The second estimation algorithm is configured to output a degree of deterioration of a second component mounted on the vehicle in response to an input of a value of a second parameter related to the second component. The first sensor is configured to detect the value of the first parameter. The second sensor is configured to detect the value of the second parameter. The control device is configured to execute a performance test by autonomous driving of the vehicle, acquire, during the performance test, first data indicating performance of the first component and second data indicating performance of the second component, update the first estimation algorithm, by using the first data acquired during the performance test, and update the second estimation algorithm, by using the second data acquired during the performance test.

Also in the vehicle according to the second aspect, it is possible to appropriately update the estimation algorithms installed in the vehicle as in the vehicle according to the first aspect described above. In the above configuration, the estimation algorithms (first estimation algorithm and second estimation algorithm) are prepared for the plurality of components (first component and second component), respectively. With the above configuration, it is possible to appropriately update the estimation algorithms for the respective components.

In the vehicle according to the second aspect of the present disclosure, the first component mounted on the vehicle may be a component for braking the vehicle. The first data indicating the performance of the first component may include data indicating braking performance of the vehicle. The second component mounted on the vehicle may be a component for driving the vehicle. The second data indicating the performance of the second component may include data indicating acceleration performance of the vehicle.

With the above configuration, the control device can easily estimate, with high accuracy, the degrees of deterioration of the component for braking the vehicle and the component for driving the vehicle by using the updated estimation algorithms (first estimation algorithm and second estimation algorithm). Thus, it is easier to keep appropriate traveling performance of the vehicle over a long period.

A method for diagnosing deterioration of a component mounted on a vehicle according to a third aspect of the present disclosure includes executing a performance test by autonomous driving of the vehicle, acquiring data indicating performance of the component during the performance test, and updating an estimation algorithm by using the data acquired during the performance test. The estimation algorithm is configured to output a degree of deterioration of the component mounted on the vehicle in response to an input of a value of a parameter related to the component.

Also in the method for diagnosing deterioration of the on-vehicle component, it is possible to appropriately update the estimation algorithm installed in the vehicle as in the vehicle described above. With the updated estimation algorithm, it is possible to estimate the degree of deterioration of the on-vehicle component with high accuracy in the vehicle in use.

With the present disclosure, the estimation algorithm installed in the vehicle can be updated appropriately.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding portions are denoted by the same signs throughout the drawings, and description thereof will not be repeated.

Figure 1:
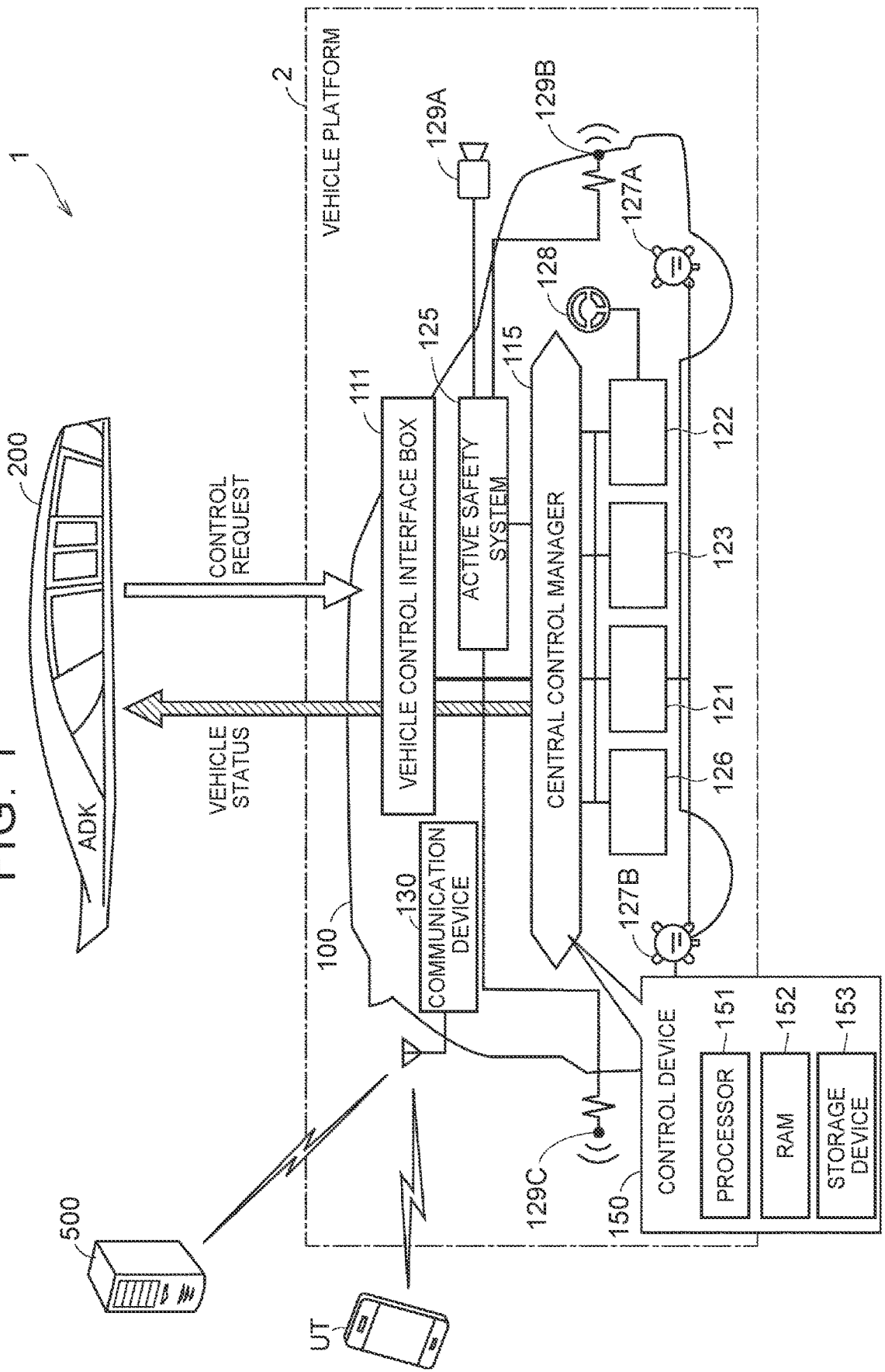
FIG. 1 is a diagram showing a schematic configuration of a vehicle according to an embodiment of the present disclosure.

FIG. 1 is a diagram showing a schematic configuration of a vehicle according to the embodiment of the present disclosure. Referring to FIG. 1, a vehicle 1 includes an autonomous driving kit (hereinafter referred to as "ADK") 200 and a vehicle platform (hereinafter referred to as "VP") 2.

The VP 2 includes a control system of a base vehicle 100 and a vehicle control interface box (hereinafter referred to as "VCIB") 111 provided in the base vehicle 100. The VCIB 111 may communicate with the ADK 200 through an in-vehicle network such as a controller area network (CAN). Although the base vehicle 100 and the ADK 200 are shown apart from each other in FIG. 1, the ADK 200 is attached to the base vehicle 100 in actuality. In the present embodiment, the ADK 200 is attached to a rooftop of the base vehicle 100. The attachment position of the ADK 200 may be changed as appropriate.

The base vehicle 100 is, for example, a commercially available electrified vehicle (EV). An EV is a vehicle using electric power as all or part of its power source. In the present embodiment, a battery electric vehicle (BEV) is adopted as the base vehicle 100. The base vehicle 100 is not limited to this, and may be an EV other than the BEV (hybrid electric vehicle (HEV), plug-in hybrid electric vehicle (PHEV), fuel cell electric vehicle (FCEV), etc.). The number of wheels of the base vehicle 100 is, for example, four. The number of wheels of the base vehicle 100 is not limited to this, and may be three or less or five or more.

The control system of the base vehicle 100 includes various systems and various sensors for controlling the base vehicle 100 in addition to a central control manager 115. The central control manager 115 centrally controls various systems related to operations of the base vehicle 100 based on signals from various sensors in the base vehicle 100 (sensor detection signals).

In the present embodiment, the central control manager 115 includes a control device 150. The control device 150 includes a processor 151, a random access memory (RAM) 152, and a storage device 153. For example, a central processing unit (CPU) can be adopted as the processor 151. The RAM 152 functions as a working memory for temporarily storing data to be processed by the processor 151. The storage device 153 is configured to save stored information. The storage device 153 includes, for example, a read-only memory (ROM) and a rewritable non-volatile memory. The storage device 153 stores, in addition to programs, information to be used in the programs (for example, maps, mathematical expressions, and various parameters). In the present embodiment, various types of vehicle control are performed by the processor 151 executing the programs stored in the storage device 153. The vehicle control in the control device 150 is not limited to execution by software, and may be executed by dedicated hardware (electronic circuit). The number of processors included in the control device 150 can be set as appropriate, and a processor may be prepared for each predetermined control.

The base vehicle 100 includes a brake system 121, a steering system 122, a power-train system 123, an active safety system 125, and a body system 126. These systems are centrally controlled by the central control manager 115. In the present embodiment, each system includes a computer. The computer of each system communicates with the central control manager 115 through the in-vehicle network (for example, CAN). The computer of each system is hereinafter referred to as "electronic control unit (ECU)".

The brake system 121 includes a braking device provided for each wheel of the base vehicle 100 and an ECU that controls the braking device. In the present embodiment, a hydraulic disc brake device is adopted as the braking device. The base vehicle 100 includes wheel speed sensors 127A, 127B. The wheel speed sensor 127A is provided on the front wheel of the base vehicle 100 and detects a rotational speed of the front wheel. The wheel speed sensor 127B is provided on the rear wheel of the base vehicle 100 and detects a rotational speed of the rear wheel. The ECU of the brake system 121 outputs, to the central control manager 115, the rotational directions and the rotational speeds of the wheels that are detected by the wheel speed sensors 127A, 127B.

The steering system 122 includes a steering device of the base vehicle 100 and an ECU that controls the steering device. The steering device includes, for example, a rack-and-pinion electric power steering (EPS) device whose steering angle can be adjusted by an actuator. The base vehicle 100 includes a pinion angle sensor 128. The pinion angle sensor 128 detects a rotation angle (pinion angle) of a pinion gear coupled to a rotation shaft of the actuator constituting the steering device. The ECU of the steering system 122 outputs the pinion angle detected by the pinion angle sensor 128 to the central control manager 115.

The power-train system 123 includes an electric parking brake (EPB) provided on at least one wheel of the base vehicle 100, a P-lock device provided on a transmission of the base vehicle 100, a shift device configured to select a shift range, a drive source for the base vehicle 100, and an ECU that controls each device in the power-train system 123. The EPB is provided separately from the braking device described above, and holds the wheels in a fixed state by an electric actuator. The P-lock device holds a rotational position of an output shaft of the transmission in a fixed state by, for example, a parking lock pawl that can be driven by an actuator. Although details will be described later, a motor supplied with electric power from a battery is adopted as the drive source for the base vehicle 100 in the present embodiment (see FIG. 4). The ECU of the power-train system 123 outputs, to the central control manager 115, information indicating whether the fixed state is caused by each of the EPB and the P-lock device, the shift range selected by the shift device, and the statuses of the battery and the motor.

The active safety system 125 includes an ECU that makes determination about the possibility of collision for the traveling vehicle 1. The base vehicle 100 includes a camera 129A and radar sensors 129B, 129C that detect conditions on the surroundings including forward and rearward areas around the vehicle 1. The ECU of the active safety system 125 determines whether collision may occur by using signals received from the camera 129A and the radar sensors 129B, 129C. When the active safety system 125 determines that collision may occur, the central control manager 115 outputs a braking command to the brake system 121 to increase a braking force of the vehicle 1. The base vehicle 100 according to the present embodiment includes the active safety system 125 from the beginning (time of shipment). The active safety system 125 is not limited to this case, and an active safety system that can be retrofitted to the base vehicle 100 may be adopted.

The body system 126 includes body components (for example, turn signals, horn, and wipers) and an ECU that controls the body components. The ECU of the body system 126 controls the body components in response to user's operations in a manual mode, and controls the body components in response to commands received from the ADK 200 via the VCIB 111 and the central control manager 115 in an autonomous mode.

The vehicle 1 is configured to perform autonomous driving. The VCIB 111 functions as a vehicle control interface. When the vehicle 1 travels by autonomous driving, the central control manager 115 and the ADK 200 exchange signals via the VCIB 111, and the central control manager 115 executes travel control in the autonomous mode (that is, autonomous driving control) in response to a command from the ADK 200. The ADK 200 is detachable from the base vehicle 100. Even when the ADK 200 is detached, the base vehicle 100 can travel alone by the user's driving. When the base vehicle 100 travels alone, the control system of the base vehicle 100 executes travel control in the manual mode (that is, travel control in response to user's operations).

In the present embodiment, the ADK 200 exchanges signals with the VCIB 111 based on an application program interface (API) that defines signals to be communicated. The ADK 200 processes various signals defined in the API. For example, the ADK 200 creates a travel plan of the vehicle 1 and outputs various commands that request control for causing the vehicle 1 to travel in accordance with the created travel plan to the VCIB 111 based on the API. Hereinafter, each of the various commands output from the ADK 200 to the VCIB 111 is also referred to as "API command". The ADK 200 receives various signals indicating the status of the base vehicle 100 from the VCIB 111 based on the API, and reflects the received status of the base vehicle 100 in the creation of the travel plan. Hereinafter, each of the various signals that the ADK 200 receives from the VCIB 111 is also referred to as "API signal". Both the API command and the API signal are examples of signals defined in the API. Details of the configuration of the ADK 200 will be described later (see FIG. 2).

The VCIB 111 receives various API commands from the ADK 200. When the API command is received from the ADK 200, the VCIB 111 converts the API command into a signal format that can be processed by the central control manager 115. Hereinafter, the API command converted into the signal format that can be processed by the central control manager 115 is also referred to as "control command". When the API command is received from the ADK 200, the VCIB 111 outputs a control command corresponding to the API command to the central control manager 115.

The control device 150 of the central control manager 115 sends various signals indicating the status of the base vehicle 100 detected by the control system of the base vehicle 100 (for example, a sensor signal or a status signal) to the ADK 200 via the VCIB 111. The VCIB 111 sequentially receives the signals indicating the status of the base vehicle 100 from the central control manager 115. The VCIB 111 determines values of API signals based on the signals received from the central control manager 115. The VCIB 111 also converts the signals received from the central control manager 115 into the API signal formats as necessary. The VCIB 111 outputs the obtained API signals to the ADK 200. The API signals indicating the status of the base vehicle 100 are sequentially output from the VCIB 111 to the ADK 200 in real time.

In the present embodiment, the central control manager 115 and the VCIB 111 exchange, for example, low-versatility signals defined by an automobile manufacturer, and the ADK 200 and the VCIB 111 exchange higher-versatility signals (for example, signals defined in a publicly available API (open API)). The VCIB 111 converts signals between the ADK 200 and the central control manager 115 so that the central control manager 115 can control the vehicle in response to commands from the ADK 200. The function of the VCIB 111 is not limited to the function of converting signals. For example, the VCIB 111 may make predetermined determination and send a signal based on the determination result (for example, a signal for notification, instruction, or request) to at least one of the central control manager 115 and the ADK 200. Details of the configuration of the VCIB 111 will be described later (see FIG. 2).

The base vehicle 100 further includes a communication device 130. The communication device 130 includes various communication interfaces (I/Fs). The control device 150 is configured to communicate with devices outside the vehicle 1 (for example, a mobile terminal UT and a server 500 described later) through the communication device 130. The communication device 130 includes a wireless communication device (for example, a data communication module (DCM)) that can access a mobile communication network (telematics). The communication device 130 communicates with the server 500 via the mobile communication network. The wireless communication device may include a communication I/F compatible with the fifth generation mobile communication system (5G). The communication device 130 also includes a communication I/F for direct communication with the mobile terminal UT present inside the vehicle or within a range around the vehicle. The communication device 130 and the mobile terminal UT may perform short-range communication such as a wireless local area network (LAN), near field communication (NFC), or Bluetooth (registered trademark).

The mobile terminal UT is a terminal carried by the user of the vehicle 1. In the present embodiment, a smartphone including a touch panel display is adopted as the mobile terminal UT. However, the mobile terminal UT is not limited to this, and any mobile terminal can be adopted, and a laptop, a tablet terminal, a wearable device (for example, a smart watch or a smart glass), an electronic key, or the like can also be adopted.

The vehicle 1 described above can be adopted as one component of a Mobility-as-a-Service (MaaS) system. The MaaS system includes, for example, a mobility service platform (MSPF). The MSPF is a unified platform connected to various mobility services (for example, various mobility services provided by ride-sharing companies, car-sharing companies, insurance companies, car-rental companies, and taxi companies). The server 500 is a computer that manages and releases information for the mobility services on the MSPF to the public. The server 500 manages information on various mobilities and provides information (for example, API and information on collaboration between mobilities) in response to requests from business operators. The business operators that provide services can use various functions provided by the MSPF by using the API publicly available on the MSPF. For example, an API required for ADK development is publicly available on the MSPF.

Figure 2:
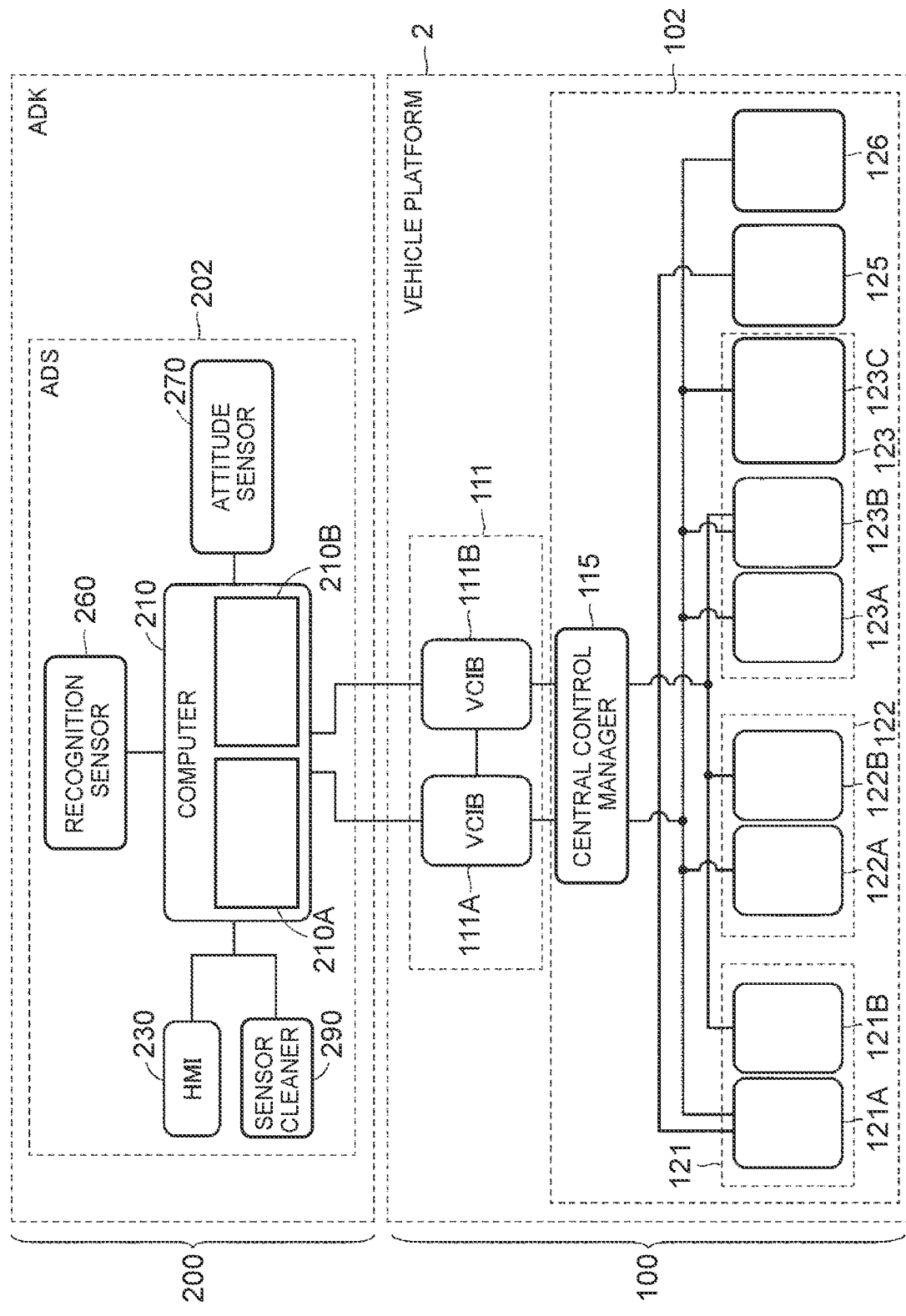
FIG. 2 is a diagram showing details of the configuration of the vehicle shown in FIG. 1.

FIG. 2 is a diagram showing details of the configuration of the vehicle 1. Referring to FIG. 2 together with FIG. 1, the ADK 200 includes an autonomous driving system (hereinafter referred to as "ADS") 202 for autonomously driving the vehicle 1. The ADS 202 includes a computer 210, a human-machine interface (HMI) 230, a recognition sensor 260, an attitude sensor 270, and a sensor cleaner 290.

The computer 210 includes a processor and a storage device that stores autonomous driving software using an API, and is configured such that the processor can execute the autonomous driving software. With the autonomous driving software, control related to the autonomous driving (see FIG. 3 described later) is executed. The autonomous driving software may sequentially be updated by using over the air (OTA) technology. The computer 210 further includes communication modules 210A, 210B.

The HMI 230 is a device for exchanging information between the user and the computer 210. The HMI 230 includes an input device and a notification device. Through the HMI 230, the user can give instructions or requests to the computer 210, or change the values of parameters (limited to those that can be changed with permission) used in the autonomous driving software. The HMI 230 may be a touch panel display that functions as both the input device and the notification device.

The recognition sensor 260 includes various sensors that acquire information for recognizing an external environment of the vehicle 1 (hereinafter also referred to as "environmental information"). The recognition sensor 260 acquires the environmental information of the vehicle 1 and outputs the environmental information to the computer 210. The environmental information is used for the autonomous driving control. In the present embodiment, the recognition sensor 260 includes a camera that images the surroundings (including forward and rearward areas) around the vehicle 1, and an obstacle detector (for example, a millimeter wave radar and/or a light detection and ranging (Lidar) sensor) that detects obstacles with electromagnetic waves or acoustic waves. For example, the computer 210 can recognize persons, objects (other vehicles, poles, guardrails, etc.) and road lines (for example, center lines) within a range recognizable from the vehicle 1 by using the environmental information received from the recognition sensor 260. Artificial intelligence (AI) or an image processing processor may be used for the recognition.

The attitude sensor 270 acquires information related to the attitude of the vehicle 1 (hereinafter also referred to as "attitude information") and outputs the information to the computer 210. The attitude sensor 270 includes various sensors that detect an acceleration, an angular velocity, and a position of the vehicle 1. In the present embodiment, the attitude sensor 270 includes an inertial measurement unit (IMU) and a global positioning system (GPS) sensor. The IMU detects accelerations of the vehicle 1 in a longitudinal direction, a lateral direction, and a vertical direction, and angular velocities of the vehicle 1 in a roll direction, a pitch direction, and a yaw direction. The GPS sensor detects the position of the vehicle 1 by using signals received from a plurality of GPS satellites. In the fields of automobiles and aircraft, there is known a technology for measuring the attitude with high accuracy by combining the IMU and the GPS. For example, the computer 210 may measure the attitude of the vehicle 1 based on the attitude information by using such a known technology.

The sensor cleaner 290 is a device that removes dirt from a sensor exposed to air outside the vehicle (for example, the recognition sensor 260). For example, the sensor cleaner 290 may clean a camera lens and an exit aperture of the obstacle detector by using a cleaning fluid and a wiper.

In the vehicle 1, predetermined functions (for example, braking, steering, and vehicle holding) are made redundant. A control system 102 of the base vehicle 100 includes a plurality of systems that implements equivalent functions. Specifically, the brake system 121 includes brake systems 121A and 121B. The steering system 122 includes steering systems 122A and 122B. The power-train system 123 includes an EPB system 123A and a P-lock system 123B. Each system includes an ECU. Even if an abnormality occurs in one of the systems that implement equivalent functions, the other system operates normally and the function works normally in the vehicle 1.

The VCIB 111 includes a VCIB 111A and a VCIB 111B. Each of the VCIB 111A and VCIB 111B includes a computer. The communication modules 210A, 210B of the computer 210 can communicate with the computers of the VCIB 111A and VCIB 111B, respectively. The VCIB 111A and the VCIB 111B are connected to communicate with each other. The VCIB 111A and VCIB 111B can operate independently. Even if an abnormality occurs in one of the VCIB 111A and VCIB 111B, the other VCIB operates normally and the VCIB 111 operates normally. Both the VCIB 111A and VCIB 111B are connected to the above systems via the central control manager 115. As shown in FIG. 2, the VCIB 111A and the VCIB 111B have different connection destinations in part.

In the present embodiment, the function of accelerating the vehicle 1 is not redundant. The power-train system 123 includes a propulsion system 123C as a system for accelerating the vehicle 1.

The vehicle 1 is switchable between the autonomous mode and the manual mode. The API signals that the ADK 200 receives from the VCIB 111 include a signal indicating which of the autonomous mode and the manual mode the vehicle 1 is in (hereinafter referred to as "autonomous state"). The user can select either the autonomous mode or the manual mode through a predetermined input device (for example, the HMI 230 or the mobile terminal UT). When either of the driving modes is selected by the user, the vehicle 1 is switched to the selected driving mode, and the result of the selection is reflected in the autonomous state. Unless the vehicle 1 is in a state in which the autonomous driving is possible, the vehicle 1 is not switched to the autonomous mode even if the user selects the autonomous mode. The switching of the driving mode of the vehicle 1 may be performed by the central control manager 115. The central control manager 115 may switch the autonomous mode and the manual mode based on vehicle conditions.

When the vehicle 1 is in the autonomous mode, the computer 210 acquires the status of the vehicle 1 from the VP 2 and sets the next operation of the vehicle 1 (for example, acceleration, deceleration, or turning). Then, the computer 210 outputs various commands for realizing the set next operation of the vehicle 1. By the computer 210 executing API software (that is, autonomous driving software using the API), commands related to the autonomous driving control are transmitted from the ADK 200 to the central control manager 115 through the VCIB 111.

Figure 3:
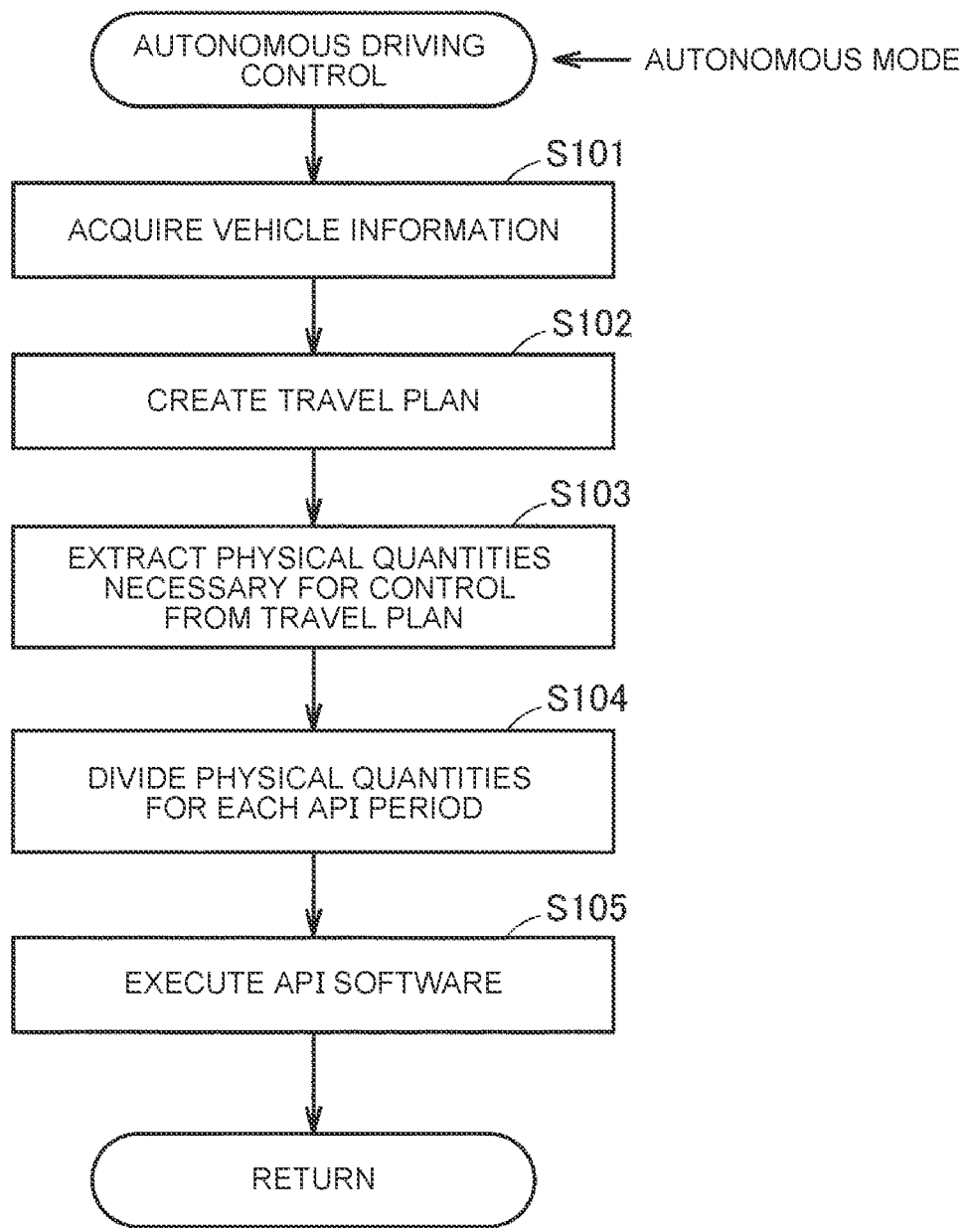
FIG. 3 is a flowchart showing a processing procedure of autonomous driving control according to the embodiment of the present disclosure.

FIG. 3 is a flowchart showing a process to be executed by the ADK 200 in the autonomous driving control according to the present embodiment. The process shown in this flowchart is repeatedly executed in a period corresponding to the API (API period) when the vehicle 1 is in the autonomous mode. Hereinafter, each step in the flowchart is simply represented by "S".

Referring to FIG. 3 together with FIGS. 1 and 2, the computer 210 acquires current information on the vehicle 1 in S101. For example, the computer 210 acquires environmental information and attitude information of the vehicle 1 from the recognition sensor 260 and the attitude sensor 270. The computer 210 also acquires API signals. In the present embodiment, API signals indicating the status of the vehicle 1 are sequentially output from the VCIB 111 to the ADK 200 in real time regardless of whether the vehicle 1 is in the autonomous mode or the manual mode. The API signals acquired by the computer 210 include, in addition to the autonomous state described above, signals indicating the rotational directions and the rotational speeds of the wheels that are detected by the wheel speed sensors 127A, 127B. When the autonomous state indicates the manual mode, the series of processes shown in FIG. 3 is terminated.

In S102, the computer 210 creates a travel plan based on the information on the vehicle 1 acquired in S101. For example, the computer 210 calculates the behavior of the vehicle 1 (for example, the attitude of the vehicle 1) and creates a travel plan suitable for the status of the vehicle 1 and the external environment. The travel plan is data indicating the behavior of the vehicle 1 during a predetermined period. When a travel plan already exists, this travel plan may be modified in S102.

In S103, the computer 210 extracts physical quantities (acceleration, tire steering angle, etc.) necessary for vehicle control from the travel plan created in S102. In S104, the computer 210 divides the physical quantities extracted in S103 for each API period. In S105, the computer 210 executes the API software by using the physical quantities divided in S104. By executing the API software in this manner, API commands (propulsion direction command, propulsion command, braking command, vehicle holding command, etc.) that request control for realizing the physical quantities in accordance with the travel plan are transmitted from the ADK 200 to the VCIB 111. The VCIB 111 transmits control commands corresponding to the received API commands to the central control manager 115, and the central control manager 115 performs the autonomous driving control on the vehicle 1 based on the control commands.

The autonomous driving of the vehicle 1 is executed by repeatedly executing the processes of S101 to S105. In the present embodiment, it is assumed that the autonomous driving of the vehicle 1 is performed while the vehicle 1 is manned. The autonomous driving of the vehicle 1 is not limited to this, and may be performed while the vehicle 1 is unmanned.

Figure 4:
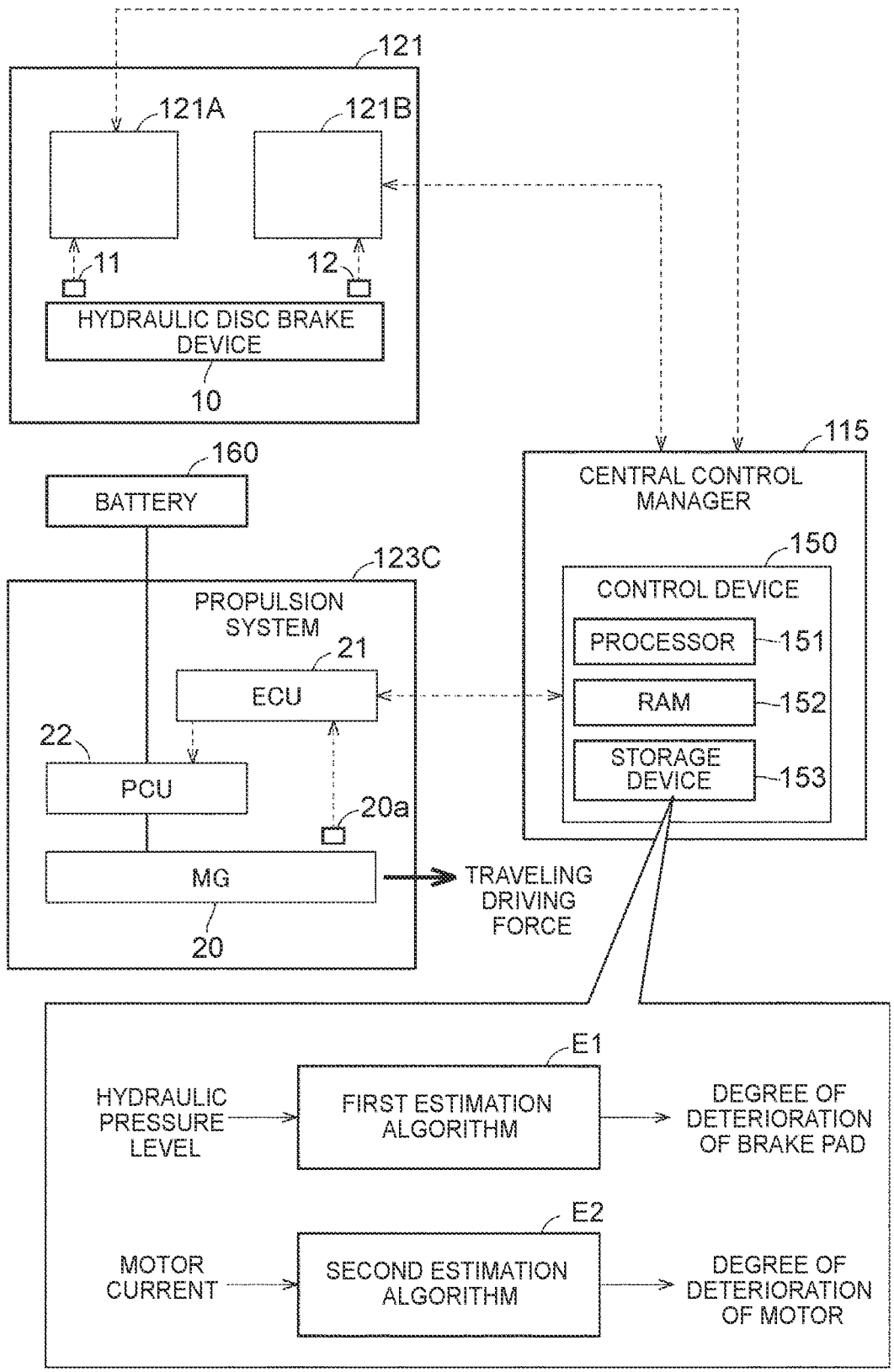
FIG. 4 is a diagram illustrating an outline of a method for diagnosing deterioration of on-vehicle components according to the embodiment of the present disclosure.

The vehicle 1 according to the present embodiment diagnoses deterioration of on-vehicle components by using estimation algorithms installed in the vehicle 1. FIG. 4 is a diagram illustrating an outline of a method for diagnosing deterioration of the on-vehicle components according to the present embodiment.

Referring to FIG. 4 together with FIGS. 1 and 2, the brake system 121 includes a hydraulic disc brake device 10. The hydraulic disc brake device 10 includes a brake mechanism and a brake actuator. The hydraulic disc brake device 10 drives the brake mechanism by using a hydraulic pressure regulated by the brake actuator.

Specifically, the brake mechanism includes a caliper fixed to a vehicle body and a brake rotor fixed to each wheel and configured to rotate together with the wheel. The caliper has a wheel cylinder and brake pads. The wheel cylinder is actuated by the pressure (that is, hydraulic pressure) of a brake oil supplied from the brake actuator. By actuating the wheel cylinder, the brake pads are pressed against the brake rotor to generate a frictional braking force. The brake pad is an example of a component for braking the vehicle 1. As the hydraulic pressure applied to the wheel cylinder increases, the frictional braking force increases. As the remaining groove of the brake pad becomes smaller, the frictional braking force of the brake pad tends to decrease. The remaining groove of the brake pad becomes smaller due to wear. As the deterioration (for example, wear) of the brake pad advances, the frictional braking force that can be obtained with the same hydraulic pressure decreases.

The brake actuator includes hydraulic circuits that supply the hydraulic pressure from a master cylinder to the wheel cylinders of the four wheels, control valves (for example, pressure reducing valves) provided in the respective hydraulic circuits, and hydraulic pressure adjustment pumps (for example, pressurization pumps).

The brake system 121 includes hydraulic pressure sensors 11, 12. Detection results from the hydraulic pressure sensors 11, 12 are output to the brake systems 121A, 121B, respectively. Each of the hydraulic pressure sensors 11, 12 detects the hydraulic pressure in each of the master cylinder and the wheel cylinder. The ECU in each of the brake systems 121A, 121B can adjust the hydraulic pressure to be applied to each wheel cylinder (and thus the braking force for each wheel) by controlling the control valve and the pump of the brake actuator. In the present embodiment, each brake pad constituting the hydraulic disc brake device 10 is an example of a "first component" according to the present disclosure. Each of the hydraulic pressure sensors 11, 12 is an example of a "first sensor" according to the present disclosure.

The vehicle 1 includes a battery 160 that supplies electric power to the propulsion system 123C. The battery 160 may be a known power storage device for vehicles (for example, a liquid secondary battery, an all-solid-state secondary battery, or an assembled battery). Examples of the secondary battery for vehicles include a lithium-ion battery and a nickel metal hydride battery.

The propulsion system 123C includes a motor generator (MG) 20, an MG sensor 20a that detects the status of the MG 20, an ECU 21, and a power control unit (PCU) 22. The propulsion system 123C generates a traveling driving force of the vehicle 1 by using the electric power stored in the battery 160. The MG 20 is, for example, a three-phase alternating current (AC) motor generator. The PCU 22 includes, for example, an inverter, a converter, and a relay (hereinafter referred to as "system main relay (SMR)"). The PCU 22 is controlled by the ECU 21. The SMR switches connection and disconnection of an electric power path from the battery 160 to the MG 20. The SMR is closed (connected) when the vehicle 1 is traveling.

The MG 20 is driven by the PCU 22 and rotates the drive wheels of the vehicle 1. The MG 20 generates regenerative power and supplies the generated electric power to the battery 160. The PCU 22 drives the MG 20 by using the electric power supplied from the battery 160. The PCU 22 drives the MG 20 with an electric power value (for example, a current value) given by an instruction from the ECU 21. In the present embodiment, the driving voltage of the MG 20 (voltage for driving the MG 20) is kept substantially constant. As the driving current of the MG 20 (current for driving the MG 20) increases, the force of the MG 20 for propelling the vehicle 1 (force for accelerating the vehicle 1) increases. The MG sensor 20a detects the driving current, the driving voltage, and the temperature of the MG 20. Detection results from the MG sensor 20a are output to the ECU 21.

The MG 20 is an example of a component for driving the vehicle 1. In the present embodiment, the vehicle 1 includes one MG 20. The number of traction motors (MGs 20) in the vehicle 1 can be set as appropriate, and may be two, three, or more. The traction motor may be an in-wheel motor. In the present embodiment, the MG 20 is an example of a "second component" according to the present disclosure. The MG sensor 20a is an example of a "second sensor" according to the present disclosure.

The control device 150 in the central control manager 115 can communicate with the ECU of the brake system 121A, the ECU of the brake system 121B, and the ECU 21 of the propulsion system 123C. The storage device 153 of the control device 150 stores a first estimation algorithm E1 and a second estimation algorithm E2. The first estimation algorithm E1 is prepared for each brake pad constituting the hydraulic disc brake device 10. In the present embodiment, the storage device 153 stores four first estimation algorithms E1 because the vehicle 1 has four sets of brake pads. The storage device 153 stores one second estimation algorithm E2 corresponding to the MG 20. In a form in which the vehicle 1 includes a plurality of traction motors, the second estimation algorithm E2 may be prepared for each traveling motor.

The first estimation algorithm E1 indicates a relationship between a hydraulic pressure level (first deterioration parameter) for the corresponding brake pad and the degree of deterioration of the brake pad. The first estimation algorithm E1 outputs the degree of deterioration of the corresponding brake pad in response to an input of the value of the hydraulic pressure level for the brake pad.

The second estimation algorithm E2 indicates a relationship between the driving current (second deterioration parameter) of the corresponding MG 20 and the degree of deterioration of the MG 20. The second estimation algorithm E2 outputs the degree of deterioration of the corresponding MG 20 in response to an input of the value of the driving current for the MG 20 (current for driving the MG 20).

In the present embodiment, an artificial intelligence (AI) algorithm is adopted as each estimation algorithm. Each estimation algorithm may be a trained model that has undergone machine learning using big data held by the server 500 (for example, data actually measured on a vehicle having the same specifications as those of the vehicle 1). The estimation algorithm is not limited to this, and may be a rule-based algorithm. Each estimation algorithm may be, for example, a mathematical expression or a map.

The control device 150 executes the autonomous driving of the vehicle 1 during a predetermined period (hereinafter referred to as "operation period"). The vehicle 1 may provide a predetermined service (for example, a physical distribution service or a passenger transportation service) by the autonomous driving during the operation period. During the autonomous driving of the vehicle 1, the process shown in FIG. 3 is executed and the control device 150 controls various systems of the vehicle 1 (for example, the brake system 121, the steering system 122, the power-train system 123, the active safety system 125, and the body system 126 shown in FIG. 2) in response to commands from the ADK 200.

The control device 150 executes the autonomous driving of the vehicle 1 also for a performance test on the on-vehicle components. The control device 150 executes the performance test by the autonomous driving of the vehicle 1 and acquires, during the performance test, first data indicating the performance of each brake pad constituting the hydraulic disc brake device 10 and second data indicating the performance of the MG 20. The control device 150 updates the first estimation algorithm E1 by using the first data acquired during the performance test, and updates the second estimation algorithm E2 by using the second data acquired during the performance test. A process for updating the estimation algorithm will be described below with reference to FIG. 5.

Figure 5:
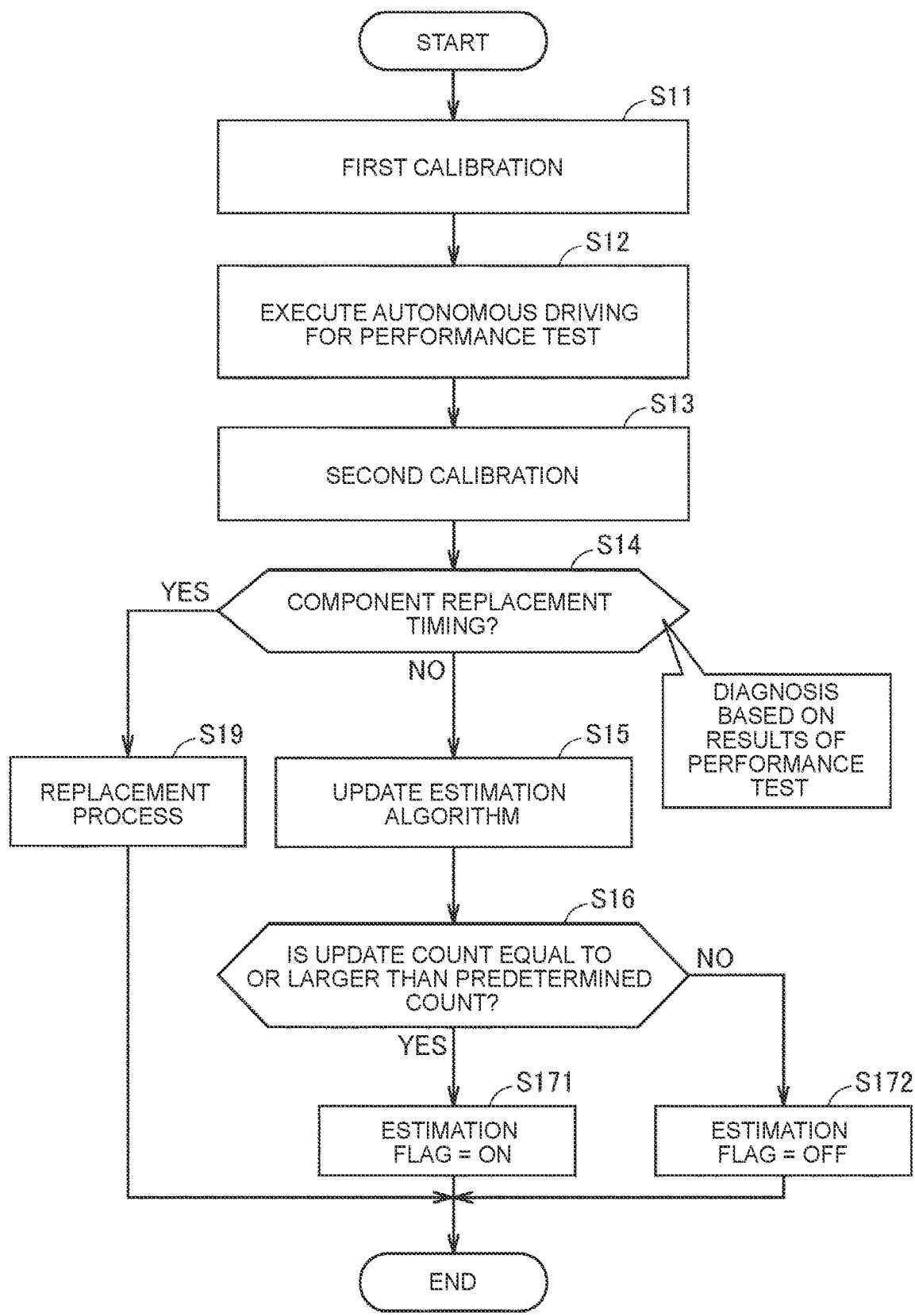
FIG. 5 is a flowchart showing a process for updating an estimation algorithm according to the embodiment of the present disclosure.

FIG. 5 is a flowchart showing the process for updating the estimation algorithm. A series of processes shown in this flowchart is started, for example, when the control system of the vehicle 1 (including the control system 102, the VCIB 111, and the ADS 202 shown in FIG. 2) is activated in a situation in which a predetermined condition is satisfied. In the present embodiment, the series of processes shown in FIG. 5 is started when the control system of the vehicle 1 is activated during an interval between the operation periods. For example, when a first operation period and a second operation period are set in the control device 150, the processes shown in FIG. 5 are started when the control system of the vehicle 1 is activated within a period from the end of the first operation period to the start of the second operation period. The second operation period is an operation period subsequent to the first operation period. The processes shown in FIG. 5 are not started even if the control system of the vehicle 1 is activated during the first operation period or the second operation period.

The activation and stop of each of the VCIB 111 and the ADS 202 may be switched in conjunction with the activation and stop of the control system 102 of the base vehicle 100. In the present embodiment, the activation and stop of the control system 102 of the base vehicle 100 are switched in conjunction with ON and OFF of a start switch of the base vehicle 100 that is operated by the user. In general, the start switch of the base vehicle 100 is referred to as "power switch" or "ignition switch".

Referring to FIG. 5 together with FIGS. 1 to 4, the control device 150 requests the ADK 200 to perform first calibration for the autonomous driving of the vehicle 1 in S11. The first calibration is calibration of the ADK 200 alone. In response to reception of the request, the computer 210 of the ADK 200 adjusts, for example, the recognition sensor 260 (camera, Lidar sensor, etc.). When a parameter to be adjusted (for example, the viewing angle of the recognition sensor 260) is outside a normal range, the computer 210 may perform the adjustment by itself or prompt the user to perform the adjustment.

In S12, the control device 150 executes the performance test by the autonomous driving of the vehicle 1. Specifically, the control device 150 requests the ADK 200 to execute the performance test, thereby executing the autonomous driving of the vehicle 1 for the performance test. Then, the control device 150 acquires data indicating the performance of a predetermined component during the performance test. In the present embodiment, each brake pad constituting the hydraulic disc brake device 10 and the MG 20 are examples of the predetermined component.

The control device 150 executes the autonomous driving control for the performance test in response to commands from the ADK 200. Specifically, the control device 150 executes predetermined acceleration control on the stopped vehicle 1, measures predetermined data (hereinafter also referred to as "acceleration data") during acceleration of the vehicle 1, and then causes the vehicle 1 to travel stably under a predetermined condition. Then, the control device 150 executes predetermined braking control on the stably traveling vehicle 1 to stop the vehicle 1. At this time, the control device 150 measures predetermined data (hereinafter also referred to as "braking data") during deceleration and stop of the vehicle 1.

In the predetermined acceleration control, a propulsion command (hereinafter also referred to as "propulsion test signal") for instructing the vehicle 1 to exert predetermined acceleration performance is transmitted from the ADK 200 to the central control manager 115 via the VCIB 111. The acceleration data includes data indicating the acceleration performance of the vehicle 1 (hereinafter also referred to as "acceleration performance data") and a driving current of the MG 20. The measured acceleration data is stored in the storage device 153.

In the present embodiment, a period from the time when the stopped vehicle 1 starts acceleration to the time when the vehicle speed reaches a predetermined speed (for example, 100 km/h or 60 miles/h) (hereinafter also referred to as "first acceleration period") is measured as the acceleration performance data. The acceleration performance data may further include the weight of the vehicle 1. As the first acceleration period decreases, the acceleration performance of the vehicle 1 increases. Even if the acceleration performance is the same, the vehicle 1 is more difficult to accelerate as the weight of the vehicle 1 increases. The control device 150 estimates the degree of deterioration of the MG 20 based on the acceleration performance data (for example, the first acceleration period). Specifically, the control device 150 estimates that the degree of deterioration of the MG 20 is higher as the acceleration performance of the vehicle 1 is lower. Then, the control device 150 records the estimated degree of deterioration of the MG 20 and the driving current of the MG 20 in the storage device 153 in association with each other.

Each of the acceleration performance data and the driving current of the MG 20 is an example of the data indicating the performance of the MG 20. As the performance of the motor increases, the driving current required to obtain the same acceleration performance decreases. The driving current of the MG 20 is measured by the MG sensor 20a (FIG. 4).

In place of or in addition to the first acceleration period, the acceleration performance data may include a period from the time when the stopped vehicle 1 starts acceleration to the time when the vehicle 1 travels a predetermined distance (hereinafter also referred to as "second acceleration period"). As the second acceleration period decreases, the acceleration performance of the vehicle 1 increases.

In the predetermined braking control, a braking command (hereinafter also referred to as "braking test signal") for instructing the vehicle 1 to exert predetermined braking performance is transmitted from the ADK 200 to the central control manager 115 via the VCIB 111. The braking data includes data indicating the braking performance of the vehicle 1 (hereinafter also referred to as "braking performance data") and a hydraulic pressure level of each brake pad. The measured braking data is stored in the storage device 153.

In the present embodiment, a braking distance (that is, a distance traveled by the vehicle 1 from the start of braking to the stop) is measured as the braking performance data. The braking performance data may further include the weight of the vehicle 1. As the braking distance decreases, the braking performance of the vehicle 1 increases. Even if the braking performance is the same, the vehicle 1 is more difficult to decelerate as the weight of the vehicle 1 increases. The control device 150 estimates the degree of deterioration of the brake pad based on the braking performance data (for example, braking distance). Specifically, the control device 150 estimates that the degree of deterioration of the brake pad is higher as the braking performance of the vehicle 1 is lower. Then, the control device 150 records the estimated degree of deterioration of the brake pad and the hydraulic pressure level of the brake pad in the storage device 153 in association with each other.

Each of the braking performance data and the hydraulic pressure level of the brake pad (that is, the hydraulic pressure applied to the wheel cylinder) is an example of the data indicating the performance of the brake pad. As the performance of the brake pad increases, the hydraulic pressure level required to obtain the same braking performance decreases. The hydraulic pressure level of each brake pad is measured by at least one of the hydraulic pressure sensors 11, 12 (FIG. 4). In the present embodiment, when no abnormality occurs in the brake system 121A and the hydraulic pressure sensor 11, the value detected by the hydraulic pressure sensor 11 is used as the braking data. When an abnormality occurs in the brake system 121A or the hydraulic pressure sensor 11, the value detected by the hydraulic pressure sensor 12 is used as the braking data.

The braking performance data may include a deceleration when the vehicle 1 starts braking, in place of or in addition to the braking distance. As the deceleration when the vehicle 1 starts braking increases, the braking performance of the vehicle 1 increases.

In S13, the control device 150 requests the ADK 200 to perform second calibration for the autonomous driving of the vehicle 1 by transmitting the results of the performance test in S12 (including the actually measured acceleration performance data and braking performance data) to the ADK 200. The second calibration is calibration related to exchange of signals between the base vehicle 100 (central control manager 115) and the ADK 200. In response to reception of the request, the computer 210 of the ADK 200 executes adjustment to match the behavior of the vehicle 1 with the commands related to the autonomous driving (for example, the propulsion command or the braking command). Specifically, when the acceleration performance obtained by the propulsion test signal is outside a normal range, the computer 210 adjusts the propulsion command such that proper acceleration performance can be obtained. When the braking performance obtained by the braking test signal is outside a normal range, the computer 210 adjusts the braking command such that proper braking performance can be obtained. In this way, the control device 150 executes the calibration for the autonomous driving of the vehicle 1 by using the data acquired by the performance test. By executing the first calibration and the second calibration, the ADK 200 completes preparation for the autonomous driving.

In S14, the control device 150 diagnoses deterioration of each brake pad constituting the hydraulic disc brake device 10 and the MG 20 by using the results of the performance test in S12. Through this deterioration diagnosis, determination is made as to whether the components need to be replaced. When the acceleration performance actually measured in the performance test is lower than a predetermined standard (first standard), the control device 150 determines that a timing to replace the MG 20 has come (YES in S14). Then, the control device 150 advances the process to S19. When the braking performance actually measured in the performance test is lower than a predetermined standard (second standard), the control device 150 determines that a timing to replace any of the brake pads constituting the hydraulic disc brake device 10 has come (YES in S14). Then, the control device 150 advances the process to S19.

In S19, the control device 150 executes a predetermined replacement process. In the predetermined replacement process, at least one of recording, notification, and transmission of a diagnosis result is executed. The diagnosis result includes information indicating a component that needs to be replaced (for example, the brake pad or the MG 20). The diagnosis result may indicate which of the brake pad and the MG 20 needs to be replaced. The control device 150 may identify the brake pad of the hydraulic disc brake device 10 that needs to be replaced based on the hydraulic pressure level of each brake pad, and add an identification result to the diagnosis result. The control device 150 may record the diagnosis result in the storage device 153. The control device 150 may cause a predetermined notification device (for example, the HMI 230 or the mobile terminal UT) to give a notification about the diagnosis result. The control device 150 may transmit the diagnosis result to the server 500. In S19, the control device 150 may execute a process for prohibiting the operation of the vehicle 1 and making arrangement for a substitute vehicle. For example, the control device 150 may request the server 500 to arrange a vehicle. When the process in S19 is executed, the series of processes shown in FIG. 5 is terminated.

When the control device 150 determines in S14 that neither the brake pad constituting the hydraulic disc brake device 10 nor the MG 20 needs to be replaced (NO in S14), the process proceeds to S15. In S15, the control device 150 updates the first estimation algorithm E1 and the second estimation algorithm E2 by using the results of the current performance test and the results of the performance test executed in the past.

Specifically, the results of the performance test recorded in the storage device 153 show a relationship between the degree of deterioration of each brake pad and the hydraulic pressure level of the brake pad (hereinafter referred to as "first relationship") and a relationship between the degree of deterioration of the MG 20 and the driving current of the MG 20 (hereinafter referred to as "second relationship"). The control device 150 uses the first relationship actually measured in the performance test to correct the first estimation algorithm E1 so that the result of estimation by the first estimation algorithm E1 approaches the actually measured data. The control device 150 uses the second relationship actually measured in the performance test to correct the second estimation algorithm E2 so that the result of estimation by the second estimation algorithm E2 approaches the actually measured data. The control device 150 may update the algorithms by using a known learning technology (regression analysis, k-nearest neighbors algorithm, decision tree, clustering, Q-learning, etc.). Rule-based algorithm update may use, for example, a least-squares method.

In S16, the control device 150 determines whether the execution count of the process of S15 (that is, the update count of the estimation algorithm) is equal to or larger than a predetermined count. The update count of the estimation algorithm is a cumulative count from the time when the vehicle 1 has acquired current specifications. For example, when the specifications of the vehicle 1 are changed to the current specifications by retrofitting, the count of update of the estimation algorithm from the retrofitting to the current time (cumulative count) corresponds to the update count of the estimation algorithm. The predetermined count can be set as appropriate. The predetermined count may be about 3 to 10, or may be more than 10.

When the update count of the estimation algorithm is equal to or larger than the predetermined count (YES in S16), the control device 150 sets an estimation flag to ON in S171. When the update count of the estimation algorithm is smaller than the predetermined count (NO in S16), the control device 150 sets the estimation flag to OFF in S172. The estimation flag is stored in the storage device 153. When the estimation flag is ON, estimation is permitted for each of the first estimation algorithm E1 and the second estimation algorithm E2. When the estimation flag is OFF, estimation is forbidden for each of the first estimation algorithm E1 and the second estimation algorithm E2. When the estimation flag is set in S171 or S172, the series of processes shown in FIG. 5 is terminated.

When the estimation flag is ON, the control device 150 executes estimation by each of the first estimation algorithm E1 and the second estimation algorithm E2 during the operation period. During the operation period, the control device 150 executes the autonomous driving of the vehicle 1 in response to commands from the ADK 200.

Figure 6:
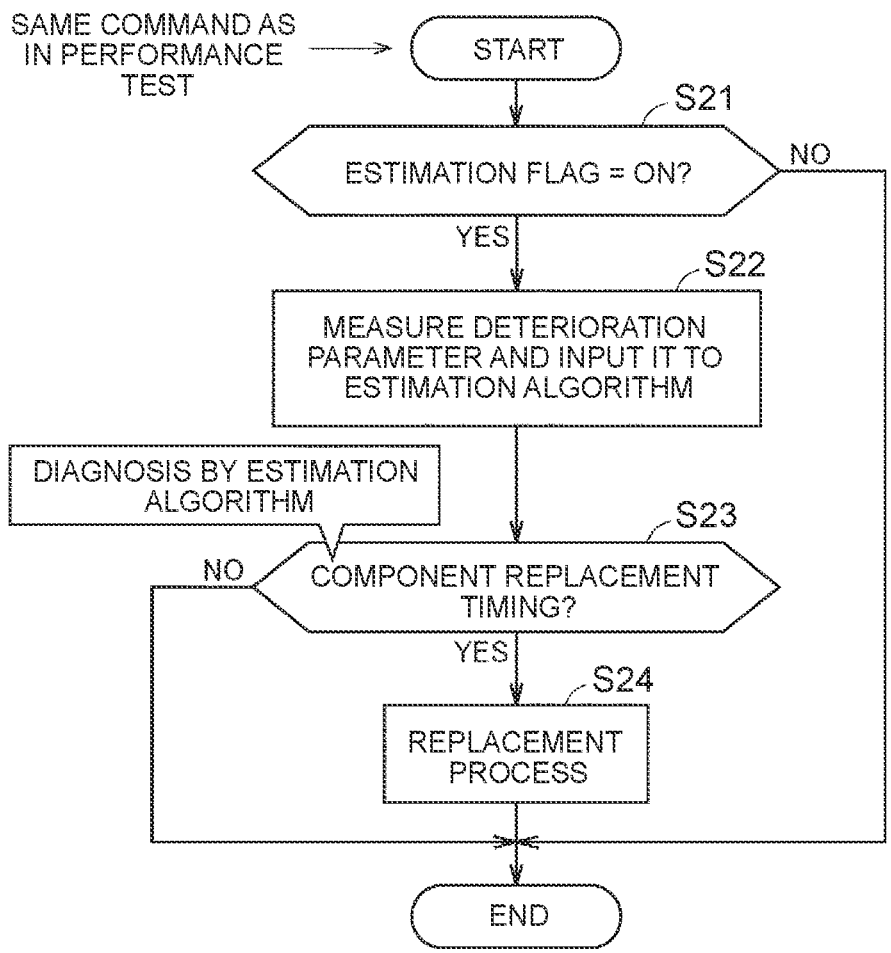
FIG. 6 is a flowchart showing a method for diagnosing deterioration of the on-vehicle components using estimation algorithms shown in FIG. 4.

FIG. 6 is a flowchart showing a method for diagnosing deterioration of the on-vehicle components using the estimation algorithms. The process shown in this flowchart is executed for each component. For example, when the control device 150 receives a predetermined braking command (more specifically, the same command as the braking test signal described above) from the ADK 200 during the operation period set in the control device 150, the control device 150 executes the following process shown in FIG. 6 for each brake pad constituting the hydraulic disc brake device 10. When the control device 150 receives a predetermined propulsion command (more specifically, the same command as the propulsion test signal described above) from the ADK 200 during the operation period set in the control device 150, the control device 150 executes the following process shown in FIG. 6 for the MG 20.

Referring to FIG. 6 together with FIGS. 1 to 4, the control device 150 determines in S21 whether the estimation flag is ON. The estimation flag is set by the process shown in FIG. 5 (S171 or S172) before the start of the operation period of the vehicle 1. When the estimation flag is OFF (NO in S21), the processes of S22 and subsequent steps are not executed, and the series of processes in FIG. 6 is terminated. When the estimation flag is ON (YES in S21), the process proceeds to S22.

In S22, the control device 150 inputs a value of the deterioration parameter detected by the on-vehicle sensor to the estimation algorithm. For example, in the process related to the brake pad, the control device 150 inputs a hydraulic pressure level of the brake pad that is detected by the hydraulic pressure sensor 11 to the first estimation algorithm E1 associated with the brake pad. The hydraulic pressure sensor 12 may be used in place of the hydraulic pressure sensor 11. The process of S22 is executed for each brake pad. In the process related to the MG 20, the control device 150 inputs a driving current of the MG 20 that is detected by the MG sensor 20a to the second estimation algorithm E2 associated with the MG 20.

In S23, the control device 150 diagnoses deterioration of the component by using the degree of deterioration of the component that is output from the estimation algorithm. Through this deterioration diagnosis, determination is made as to whether the component needs to be replaced. For example, in the process related to the brake pad, the control device 150 determines whether the degree of deterioration of the brake pad that is output from the first estimation algorithm E1 has exceeded a predetermined threshold (first threshold). When the degree of deterioration of the brake pad has exceeded the first threshold, the control device 150 determines that the timing to replace the brake pad has come (YES in S23), and advances the process to S24. The process of S23 is executed for each brake pad. In the process related to the MG 20, the control device 150 determines whether the degree of deterioration of the MG 20 that is output from the second estimation algorithm E2 has exceeded a predetermined threshold (second threshold). When the degree of deterioration of the MG 20 has exceeded the second threshold, the control device 150 determines that the timing to replace the MG 20 has come (YES in S23), and advances the process to S24.

In S24, the control device 150 executes a predetermined replacement process. In S24, at least one of recording, notification, and transmission of a diagnosis result may be executed as in S19 of FIG. 5. In S24, the control device 150 may further execute traveling for interrupting the autonomous driving (operation of the vehicle 1) and make arrangement for a substitute vehicle.

When determination is made in S23 that neither the brake pad constituting the hydraulic disc brake device 10 nor the MG 20 needs to be replaced (NO in S23), the series of processes shown in FIG. 6 is terminated. As described above, the control device 150 determines whether the degree of deterioration of the on-vehicle component has exceeded the predetermined threshold based on the output from the estimation algorithm during the operation of the vehicle 1. With such a configuration, it is easier to replace the on-vehicle component at an appropriate timing.

As described above, the method for diagnosing deterioration of the on-vehicle component according to the present embodiment includes the processes shown in FIGS. 5 and 6. In S12 of FIG. 5, the vehicle 1 executes the performance test by the autonomous driving, and acquires the data indicating the performance of the component during the performance test. In S15 of FIG. 5, the vehicle 1 updates the estimation algorithm by using the data acquired during the performance test. In S22 and S23 of FIG. 6, the vehicle 1 estimates the degree of deterioration of the component by using the updated estimation algorithm. With such a method for diagnosing deterioration of the on-vehicle component, it is possible to appropriately update the estimation algorithm installed in the vehicle 1. With the updated estimation algorithm, it is possible to estimate the degree of deterioration of the on-vehicle component with high accuracy in the vehicle 1 in use.

The braking device provided in the brake system 121 is not limited to the hydraulic disc brake device. An electric service brake device may be adopted in place of the hydraulic disc brake device. In place of the first estimation algorithm E1 shown in FIG. 4, the storage device 153 may store the following first estimation algorithm E1A shown in FIG. 7.

Figure 7:
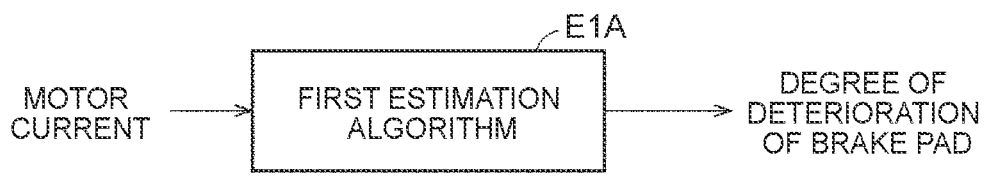
FIG. 7 is a diagram showing a modification of a first estimation algorithm shown in FIG. 4.

FIG. 7 is a diagram showing a modification of the first estimation algorithm E1. Referring to FIG. 7, the first estimation algorithm E1A outputs the degree of deterioration of the corresponding brake pad in response to an input of a driving current of an electric motor constituting the electric service brake device (motor that pushes a piston of the master cylinder in place of the hydraulic pump). The first estimation algorithm E1A may be updated in S15 of the process shown in FIG. 5 and the driving current of the electric motor (sensor detection value) may be input to the first estimation algorithm E1A in S22 of the process shown in FIG. 6.

Figure 8:
FIG. 8 is a diagram showing a first modification of a second estimation algorithm shown in FIG. 4.

In the embodiment described above, the storage device 153 may store the following second estimation algorithm E2A shown in FIG. 8 in place of the second estimation algorithm E2 shown in FIG. 4.

FIG. 8 is a diagram showing a first modification of the second estimation algorithm E2. Referring to FIG. 8, the second estimation algorithm E2A outputs the degree of deterioration of the MG 20 in response to an input of a temperature of the MG 20. The second estimation algorithm E2A may be updated in S15 of the process shown in FIG. 5 and the temperature of the MG 20 (sensor detection value) may be input to the second estimation algorithm E2A in S22 of the process shown in FIG. 6.

A plurality of parameters may be input to the estimation algorithm. For example, in the embodiment described above, the storage device 153 may store the following second estimation algorithm E2B shown in FIG. 9 in place of the second estimation algorithm E2 shown in FIG. 4.

Figure 9:
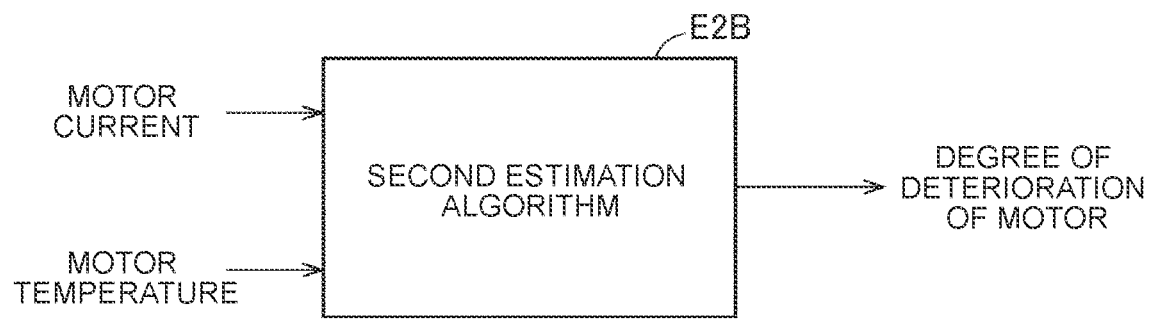
FIG. 9 is a diagram showing a second modification of the second estimation algorithm shown in FIG. 4.

FIG. 9 is a diagram showing a second modification of the second estimation algorithm E2. Referring to FIG. 9, the second estimation algorithm E2B outputs the degree of deterioration of the MG 20 in response to an input of the driving current and the temperature of the MG 20. The second estimation algorithm E2B may be updated in S15 of the process shown in FIG. 5 and the driving current and the temperature of the MG 20 (sensor detection values) may be input to the second estimation algorithm E2B in S22 of the process shown in FIG. 6.

In the embodiment described above, the first estimation algorithm E1 or the second estimation algorithm E2 may be omitted. Conversely, the number of estimation algorithms may be increased. For example, an estimation algorithm may be prepared also for a component related to the steering of the vehicle 1.

The configuration of the vehicle is not limited to the configuration described in the embodiment described above (see FIGS. 1, 2, and 4). The base vehicle may have the autonomous driving function without retrofitting. The level of the autonomous driving may be fully autonomous driving (Level 5) or conditional autonomous driving (for example, Level 4). The configuration of the vehicle may be changed as appropriate to a configuration exclusively for unmanned driving. For example, a vehicle exclusively for unmanned driving need not include components for a person to operate the vehicle (such as a steering wheel). The vehicle may include a solar panel or may have a flight function. The vehicle is not limited to a passenger car, and may be a bus or a truck. The vehicle may be a privately owned vehicle (POV). The vehicle may be a multipurpose vehicle that is customized according to the user's purpose of use. The vehicle may be a mobile shop vehicle, a robotaxi, an automated guided vehicle (AGV), or an agricultural machine. The vehicle may be an unmanned or single-seater small-sized BEV (for example, a micropallet).

The embodiment disclosed herein should be considered to be illustrative and not restrictive in all respects. The technical scope of the present disclosure is shown by the claims rather than by the above description of the embodiment, and is intended to include all modifications within the meaning and scope equivalent to those of the claims.

What is claimed is:

1. A vehicle comprising:
a storage device configured to store an estimation algorithm configured to output a degree of deterioration of a component mounted on the vehicle in response to an input of a value of a parameter related to the component, wherein the component mounted on the vehicle is a traction motor, and the parameter related to the component is at least one of a current for driving the traction motor and a temperature of the traction motor;
an autonomous driving kit attached to a rooftop of the vehicle;
a sensor configured to detect the value of the parameter;
a control device; and
a vehicle control interface configured to mediate exchange of a signal between the control device and the autonomous driving kit;
the control device configured to:
execute a performance test by autonomous driving of the vehicle;
acquire data indicating performance of the component during the performance test, the data acquired by the performance test includes data indicating acceleration performance of the vehicle; and
update the estimation algorithm by using the data acquired during the performance test, wherein
the autonomous driving kit is configured to send a command for the autonomous driving to the control device via the vehicle control interface,
the control device is further configured to:
control the vehicle in response to the command from the autonomous driving kit;
send the signal indicating a status of the vehicle to the autonomous driving kit via the vehicle control interface, and
the autonomous driving of the vehicle is carried out after creating a travel plan for the vehicle based on the command for realizing a plurality of physical quantities in accordance with the travel plan, the plurality of physical quantities including an acceleration and a tire steering angle.

2. The vehicle according to claim 1, wherein the control device is configured to:
execute the autonomous driving of the vehicle during a predetermined operation period; and
when a first operation period and a second operation period are set in the control device, execute the performance test within a period from an end of the first operation period to a start of the second operation period, the second operation period being an operation period subsequent to the first operation period.

3. The vehicle according to claim 2, wherein the control device is configured to:
input the value of the parameter detected by the sensor to the estimation algorithm during the operation period; and
determine, by using the degree of deterioration of the component that is output from the estimation algorithm, whether the degree of deterioration of the component exceeds a predetermined threshold.

4. The vehicle according to claim 1, wherein:
the control device is configured to execute calibration for the autonomous driving of the vehicle by using the data acquired by the performance test.

5. The vehicle according to claim 1, wherein the control device is configured to, when an update count of the estimation algorithm is equal to or larger than a predetermined count, estimate the degree of deterioration of the component by using the estimation algorithm during the autonomous driving of the vehicle.

6. The vehicle according to claim 1, further comprising a control system that includes a brake system, a steering system, a power train system, an active safety system, and a body system, wherein the control device is configured to:
execute predetermined acceleration control of the vehicle;
measure acceleration data during acceleration of the vehicle;
cause the vehicle to travel stably under a predetermined condition, the predetermined condition including activating the control system of the vehicle during an interval between operation periods; and
execute predetermined braking control of the vehicle by measuring braking data during deceleration of the vehicle to stop the vehicle.

7. The vehicle according to claim 1, wherein the autonomous driving kit completes preparation of the autonomous driving of the vehicle by:
the control device being configured to request the autonomous driving kit to perform a first calibration for the autonomous driving of the vehicle;
the autonomous driving kit being configured to, in response to the request from the control device to perform the first calibration, adjust a recognition sensor;
the control device being configured to request the autonomous driving kit to perform a second calibration for the autonomous driving of the vehicle by transmitting results of the performance test; and
the autonomous driving kit being configured to, in response to the request from the control device to perform the second calibration, match a behavior of the vehicle with a propulsion command or a braking command related to the autonomous driving.

8. A vehicle comprising:
a storage device configured to store a first estimation algorithm and a second estimation algorithm, the first estimation algorithm being configured to output a degree of deterioration of a first component mounted on the vehicle in response to an input of a value of a first parameter related to the first component, the second estimation algorithm being configured to output a degree of deterioration of a second component mounted on the vehicle in response to an input of a value of a second parameter related to the second component, the first component mounted on the vehicle is a component for braking the vehicle, and the second component mounted on the vehicle is a component for driving the vehicle;
a first sensor configured to detect the value of the first parameter;
a second sensor configured to detect the value of the second parameter;
an autonomous driving kit attached to a rooftop of the vehicle;
a control device; and
a vehicle control interface configured to mediate exchange of a signal between the control device and the autonomous driving kit;
the control device configured to:
   execute a performance test by autonomous driving of the vehicle;
   acquire, during the performance test, first data indicating performance of the first component and second data indicating performance of the second component, the first data indicating the performance of the first component includes data indicating braking performance of the vehicle, the second data indicating the performance of the second component includes data indicating acceleration performance of the vehicle;
   update the first estimation algorithm, by using the first data acquired during the performance test; and
   update the second estimation algorithm, by using the second data acquired during the performance test, wherein:
the autonomous driving kit is configured to send a command for the autonomous driving to the control device via the vehicle control interface,
the control device is further configured to:
   control the vehicle in response to the command from the autonomous driving kit;
   send the signal indicating a status of the vehicle to the autonomous driving kit via the vehicle control interface, and
the autonomous driving of the vehicle is carried out after creating a travel plan for the vehicle based on the command for realizing a plurality of physical quantities in accordance with the travel plan, the plurality of physical quantities including an acceleration and a tire steering angle.

9. A method for diagnosing deterioration of a component mounted on a vehicle, the method comprising:
   executing a performance test by autonomous driving of the vehicle;
   acquiring data indicating performance of the component during the performance test, the data acquired by the performance test includes data indicating acceleration performance of the vehicle;
   updating an estimation algorithm by using the data acquired during the performance test, the estimation algorithm being configured to output a degree of deterioration of the component mounted on the vehicle in response to an input of a value of a parameter related to the component, wherein the component mounted on the vehicle is a traction motor, and the parameter related to the component is at least one of a current for driving the traction motor and a temperature of the traction motor;
   sending, by an autonomous driving kit attached to a rooftop of the vehicle, a command for the autonomous driving to the control device via a vehicle control interface;
   controlling the vehicle in response to the command from the autonomous driving kit;
   sending a signal indicating a status of the vehicle to the autonomous driving kit via the vehicle control interface; and
   carrying out the autonomous driving of the vehicle after creating a travel plan for the vehicle based on the command for realizing a plurality of physical quantities in accordance with the travel plan, the plurality of physical quantities including an acceleration and a tire steering angle.

* * * * *